United States Patent
Li et al.

(10) Patent No.: US 10,171,735 B2
(45) Date of Patent: Jan. 1, 2019

(54) PANORAMIC VISION SYSTEM

(71) Applicant: Industrial Technology Research Institute, Hsinchu (TW)

(72) Inventors: Jung-Yu Li, Hsinchu (TW); Shih-Pu Chen, Hsinchu (TW); Yi-Ping Lin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 90 days.

(21) Appl. No.: 15/605,355

(22) Filed: May 25, 2017

(65) Prior Publication Data

US 2018/0167555 A1 Jun. 14, 2018

(30) Foreign Application Priority Data

Dec. 14, 2016 (TW) .............................. 105141390 A (51) Int. Cl.
*H04N 13/111* (2018.01)
*G09G 3/32* (2016.01)
(Continued)

(52) U.S. Cl.
CPC ....... *H04N 5/23238* (2013.01); *G06T 3/4038* (2013.01); *G09G 3/003* (2013.01);
(Continued)

(58) Field of Classification Search
None
See application file for complete search history.

(56) References Cited

U.S. PATENT DOCUMENTS

| 3,718,989 A | 3/1973 | Mcknight |
| 5,433,608 A | 7/1995 | Murray |
(Continued)

FOREIGN PATENT DOCUMENTS

| CN | 201930207 U | 8/2011 |
| CN | 202487092 U | 10/2012 |
(Continued)

OTHER PUBLICATIONS

Taiwanese Office Action dated Jun. 13, 2017, as issued in corresponding Taiwan Patent Application No. 105141390, 7 pages.

*Primary Examiner* — Reza Aghevli
(74) *Attorney, Agent, or Firm* — Muncy, Geissler, Olds & Lowe, P.C.

(57) ABSTRACT

A panoramic vision system includes a processor configured to convert received images into images in a spherical coordinate; a memory coupled to the processor and configured to store the images in the spherical coordinate; and a spherical display coupled to the processor, wherein the spherical display has a sphere center, the spherical display comprises a plurality of light-emitting-diode pixels being arranged according to the spherical coordinate, there is a same radial distance between each light-emitting-diode pixel of the plurality of light-emitting-diode pixels and the sphere center, in the plurality of light-emitting-diode pixels, there is a same azimuth spacing between adjacent two of the plurality of light-emitting-diode pixels at a zenith angle, and there is a same zenith spacing between adjacent two of the plurality of light-emitting-diode pixels at an azimuth angle.

24 Claims, 7 Drawing Sheets

(51) Int. Cl.
  *G06T 3/40* (2006.01)
  *G09G 3/00* (2006.01)
  *H04N 5/232* (2006.01)
(52) U.S. Cl.
  CPC ............ *G09G 3/32* (2013.01); *H04N 13/111*
   (2018.05); *G06T 2200/32* (2013.01)

(56) References Cited

U.S. PATENT DOCUMENTS

| | | | | |
|---|---|---|---|---|
| 6,152,739 | A * | 11/2000 | Amery | G06F 3/1446 |
| | | | | 345/1.3 |
| 6,814,578 | B2 * | 11/2004 | Vorst | G09B 9/326 |
| | | | | 345/1.1 |
| 7,708,561 | B2 | 5/2010 | Ponder et al. | |
| 8,403,502 | B2 * | 3/2013 | Oren | G09B 9/32 |
| | | | | 353/119 |
| 8,547,295 | B2 * | 10/2013 | Vidal | G02B 17/0605 |
| | | | | 345/1.3 |
| 8,704,879 | B1 | 4/2014 | Cheng et al. | |
| 2004/0125151 | A1 * | 7/2004 | Hamilton | G09B 9/00 |
| | | | | 715/848 |
| 2012/0033069 | A1 * | 2/2012 | Becker | G01S 17/89 |
| | | | | 348/135 |
| 2012/0178054 | A1 | 7/2012 | Jomander et al. | |
| 2012/0327527 | A1 * | 12/2012 | Jarvis | G02B 27/2278 |
| | | | | 359/858 |
| 2014/0204175 | A1 * | 7/2014 | Yang | H04N 13/261 |
| | | | | 348/43 |
| 2015/0017609 | A1 | 1/2015 | Leao et al. | |
| 2015/0022425 | A1 * | 1/2015 | Kaihotsu | G06F 3/1423 |
| | | | | 345/1.3 |
| 2015/0061988 | A1 | 3/2015 | Galu, Jr. | |
| 2016/0073104 | A1 * | 3/2016 | Hillebrand | H04N 17/002 |
| | | | | 348/47 |

FOREIGN PATENT DOCUMENTS

| | | |
|---|---|---|
| CN | 102980513 A | 3/2013 |
| CN | 202795801 U | 3/2013 |
| CN | 105869110 A | 8/2016 |
| TW | 201322106 A | 6/2013 |
| WO | WO2008022464 A1 | 2/2008 |

* cited by examiner

PANORAMIC VISION SYSTEM

CROSS REFERENCE TO RELATED APPLICATION

This application claims the priority benefits of Taiwan Application No. 105141390, entitled "PANORAMIC VISION SYSTEM," and filed with the Taiwan Intellectual Property Office on Dec. 14, 2016. The entirety of which is incorporated by reference herein.

TECHNICAL FIELD

The disclosure relates to a panoramic vision system.

BACKGROUND

Most of the existing flight simulators use projectors to create an external field of view. Usually, multiple projectors are combined for creating a wide viewing angle similar to the human vision. A collimated projection system is often used to create depth of fields (DOF). The collimated projection system utilizes the effect of multi-reflect and multi-refract to enhance the depth efficiency of an image. After the image is multi-reflected, the light intensity of the image is weakened. This may result in a light intensity difference between an original image and a reflected image. During an actual flight, pilots may encounter a strong backlighting outside the windows, which affects the vision of the pilots. In addition, the light penetrating through the windows and entering the cockpit may affect the operating of the pilots. Since the collimated projection system is limited by the optical mechanism of the projectors, part of the viewing angles and the light intensity are restricted.

SUMMARY

The present disclosure provides a panoramic vision system. In an embodiment, the panoramic vision system comprises a processor configured to convert received images into images in a spherical coordinate; a memory coupled to the processor and configured to store the images in the spherical coordinate; and a spherical display coupled to the processor, wherein the spherical display has a sphere center, the spherical display comprises a plurality of light-emitting-diode pixels being arranged according to the spherical coordinate, there is a same radial distance between each light-emitting-diode pixel of the plurality of light-emitting-diode pixels and the sphere center, in the plurality of light-emitting-diode pixels, there is a same azimuth spacing between adjacent two of the plurality of light-emitting-diode pixels at a zenith angle, and there is a same zenith spacing between adjacent two of the plurality of light-emitting-diode pixels at an azimuth angle.

DETAILED DESCRIPTION OF DISCLOSED EMBODIMENTS

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The present disclosure provides a panoramic vision system. Taking a spherical coordinate as a position reference, light-emitting-diode (LED) pixels are stacked by a dense arrangement. The LED pixels are arranged in an enclosed structure such as a spherical structure, a hemispherical structure, a curved structure, or any shaped and closed structure. The panoramic vision system may be applied to a flight simulator, which creates external views of cockpits and provides the pilots with visual perception and location perception of external environment of the aircraft.

Figure 1:
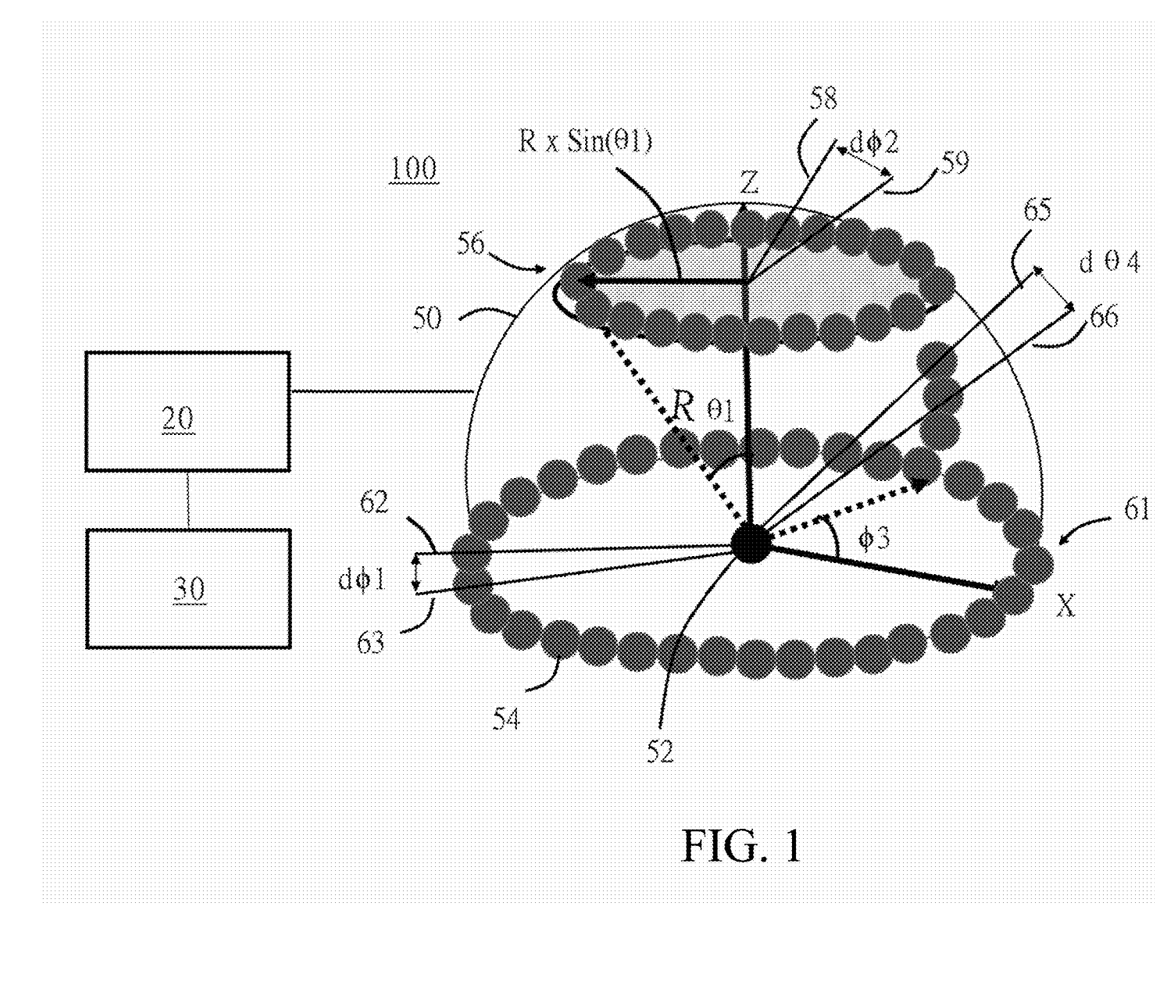
FIG. 1 is a diagram illustrating a panoramic vision system in accordance with an embodiment of the present disclosure.

FIG. 1 is a diagram illustrating a panoramic vision system 100 in accordance with an embodiment of the present disclosure. The panoramic vision system 100 comprises a processor 20, wherein the processor 20 is configured to convert received images into images in a spherical coordinate; a memory 30 coupled to the processor 20, wherein the memory 30 is configured to store the images in the spherical coordinate; and a spherical display 50 coupled to the processor 20, wherein the spherical display 50 has a sphere center 52, the spherical display 50 comprises a plurality of light-emitting-diode pixels 54 being arranged according to the spherical coordinate, there is a same radial distance R between each light-emitting-diode pixel of the plurality of light-emitting-diode pixels 54 and the sphere center 52. In the plurality of light-emitting-diode pixels 54, there is a same azimuth spacing $d\phi2$ between adjacent two of the plurality of light-emitting-diode pixels 54 at a zenith angle $\theta1$, and there is a same zenith spacing $d\theta4$ between adjacent two of the plurality of light-emitting-diode pixels 54 at an azimuth angle $\phi3$.

In detailed, the spherical coordinate system uses a radial distance R, an azimuth angle $\phi$, and a zenith angle $\theta$ to describe a position of a point in a three-dimensional space. At the zenith angle $\theta1$, the light-emitting-diode pixels 54 are regarded as a circle 56. A distance measuring from any one of the light-emitting-diode pixels 54 in the circle 56 to the Z axis is $R \times \mathrm{Sin}(\theta1)$. Any adjacent two light-emitting-diode pixels 54 in the circle 56 are equally spaced. There is a same azimuth spacing $d\phi2$ between the adjacent two of the light-emitting-diode pixels 54 at the zenith angle $\theta1$. For example, a line 58 extends from a center of one light-emitting-diode pixel 54 to the Z axis. A line 59 extends from a center of adjacent one light-emitting-diode pixel 54 to the Z axis. The line 58 and the line 59 form the azimuth spacing $d\phi2$. At the zenith angle $\theta$ of 90 degrees ($\theta=90°$), the light-emitting-diode pixels 54 are regarded as a circle 61. A distance measuring from any one of the light-emitting-diode pixels 54 in the circle 61 to the Z axis is equivalent to the radial distance R. Any adjacent two light-emitting-diode pixels 54 in the circle 61 are equally spaced. There is a same azimuth spacing dϕ1 between the adjacent two of the light-emitting-diode pixels 54 at the zenith angle θ of 90 degrees. For example, a line 62 extends from a center of one light-emitting-diode pixel 54 to the Z axis. A line 63 extends from a center of adjacent one light-emitting-diode pixel 54 to the Z axis. The line 62 and the line 63 form the azimuth spacing dϕ1. Therefore, at different zenith angles θ, there are different azimuth spacing between adjacent two light-emitting-diode pixels 54 on each plane, such as the circles 56 and 61.

At an azimuth angle ϕ3, there is a same zenith spacing dθ4 between adjacent two of the light-emitting-diode pixels 54. For example, a line 65 extends from the sphere center 52 to a center of one light-emitting-diode pixel 54. A line 66 extends from the sphere center 52 to a center of adjacent one light-emitting-diode pixel 54. The line 65 and the line 66 form a zenith spacing dθ4. At different azimuth angles ϕ, the zenith spacing between adjacent two light-emitting-diode pixels 54 of each longitudinal section is still the same.

In an embodiment, the spherical display 50 may be supported by a steel structure or boards of other materials. The light-emitting-diode pixels 54 may be bonded directly or indirectly to the boards.

The processor 20 may be implemented by a chip that is programmable and capable of operating, such as a central processing unit or a micro-processor. In an embodiment, the processor 20 converts received images (in the rectangular coordinate) from external environments into images in the spherical coordinate. In another embodiment, the processor 20 calculates a three-dimensional simulated scene and converts the simulated scene into images in the spherical coordinate. The images in the spherical coordinate are compatible with the spherical display 50. In an embodiment, after programming, the processor 20 uses a two-dimensional-plus-depth-of-field (2D-plus-Depth) image algorithm. By using the two-dimensional-plus-depth-of-field image algorithm, images of the spherical display 50 will have depth of fields. In addition, the images having near distances are relatively brighter. The images having far distances are relatively darker. The three-dimensional effects for the images are generated by the shadows. So that, the images in the spherical coordinate are compatible with the spherical display 50.

The memory 30 is configured to store image data. The memory 30 may be implemented by, for example, a non-volatile memory or a volatile memory. In an embodiment, the memory 30 stores image data of flight simulations, such as images outside a cockpit during a flight training.

In an embodiment, a display has a curved-surface shape in which light-emitting-diode pixels are still arranged according to the spherical coordinate above mentioned. There is a same radial distance between each of the light-emitting-diode pixels and the sphere center. This arrangement brings out a dense stacking structure of the light-emitting-diode pixels. In another embodiment, a display is shaped as a hemispherical structure in which the display has an opening. The light-emitting-diode pixels are still arranged according to the spherical coordinate above mentioned.

Figure 2:
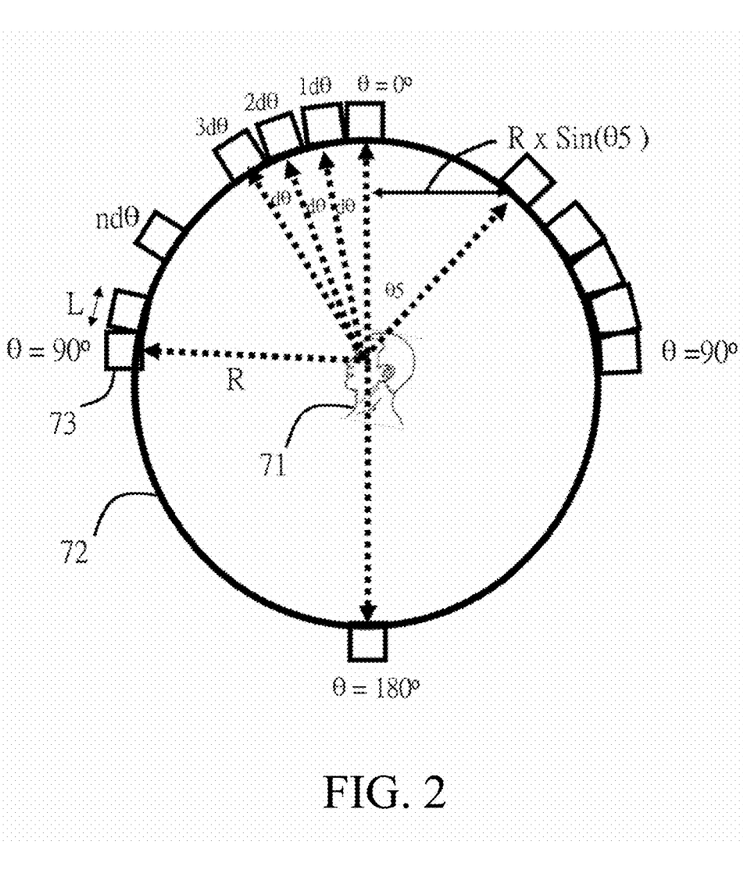
FIG. 2 is a cross-sectional view illustrating the panoramic vision system in accordance with an embodiment of the present disclosure.

FIG. 2 is a cross-sectional view illustrating the panoramic vision system 100 in accordance with an embodiment of the present disclosure. A circle 72 represents a longitudinal cross-sectional view at any azimuth angle ϕ. If the spherical display 50 is a complete sphere, light-emitting-diode pixels 73 are distributed between θ=0° and θ=180°. If the spherical display 50 is hemisphere, the zenith angles between θ=90° and θ=180° represent the ground. The light-emitting-diode pixels 73 are distributed between θ=0° and θ=90°. The ranges of zenith angles are closely related to a structure of the spherical display 50. Assuming that a user 71 is standing at the sphere center 52, the zenith angle θ is referred to as an elevation angle of the user 71. There is a radial distance R between each of the light-emitting-diode pixels 73 and the sphere center 52. A zenith spacing between any adjacent two of the light-emitting-diode pixels 73 is labeled as dθ. Beginning with θ=0°, zenith angles of the light-emitting-diode pixels 73 are shown as θ=0, dθ, 1dθ, 2dθ, 3dθ ... ndθ ... , , and θ=90°, respectively. In an embodiment, the zenith spacing dθ is equivalent to 360/(2πR/L). The symbol R represents the radial distance. The symbol L represents a width of a light-emitting surface of each of the light-emitting-diode pixels 73. In an embodiment, at any azimuth angle ϕ, a number of the light-emitting-diode pixels 73 is πR/2L. The symbol R represents the radial distance. The symbol L represents a width of a light-emitting surface of each of the light-emitting-diode pixels 73. An azimuth angle ϕ corresponds to a quarter of the circle 72 so that a number of the light-emitting-diode pixels 73 is (2πR/L)*¼. In an embodiment, in the light-emitting-diode pixels 73, there is still the same zenith spacing dθ between adjacent two of the light-emitting-diode pixels 73 at another azimuth angle ϕ.

Figure 3:
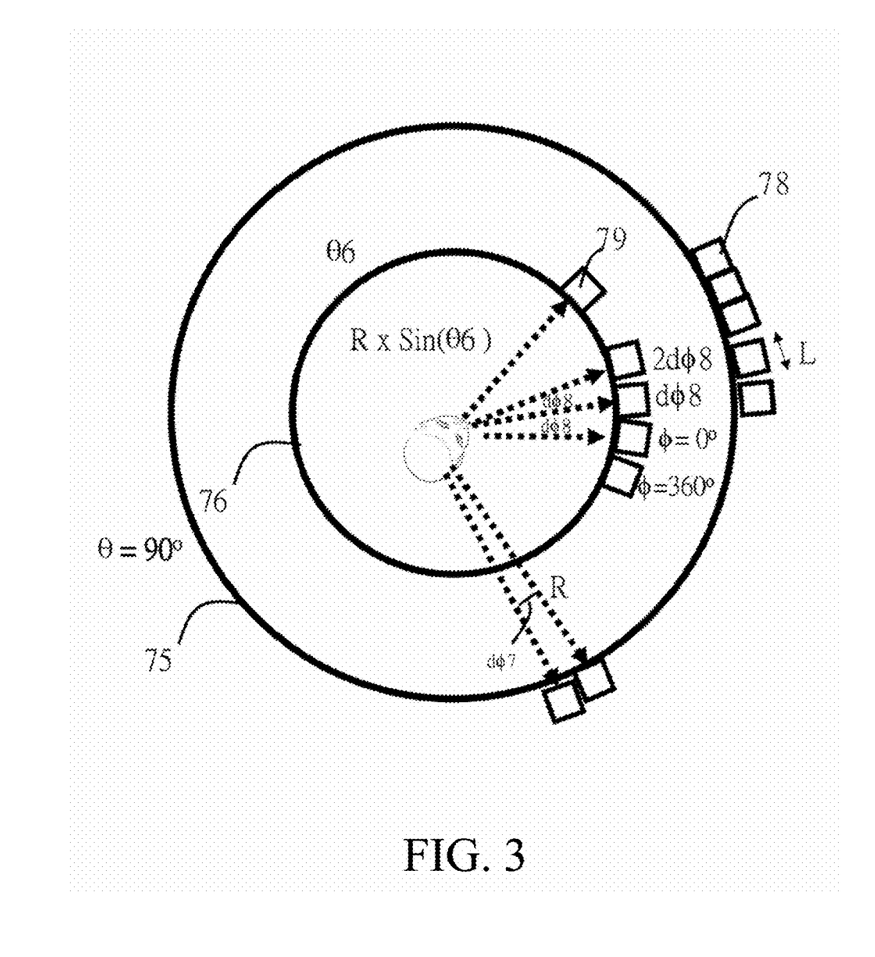
FIG. 3 is a top sectional view illustrating the panoramic vision system in accordance with an embodiment of the present disclosure.

FIG. 3 is a top sectional view illustrating the panoramic vision system 100 in accordance with an embodiment of the present disclosure. According to the embodiment, in light-emitting-diode pixels (78 or 79), there is a same azimuth spacing dϕ) between adjacent two of the light-emitting-diode pixels at a zenith angle (θ6 or) θ=90°. The azimuth spacing dϕ is equivalent to 360/(2πR Sin(θ)/L). The symbol R represents the radial distance. The symbol L represents a width of a light-emitting surface of each of the light-emitting-diode pixels. The symbol θ represents a zenith angle. A number of the light-emitting-diode pixels is 2πR Sin(θ)/L. A circle 75 and a circle 76 respectively represent horizontal sectional views of different zenith angles θ. The circle 75 represents a distribution of the light-emitting-diode pixels 78 at a zenith angle θ=90°. The circle 76 represents a distribution of the light-emitting-diode pixels 79 at a zenith angle θ6. The azimuth angles ϕ of both circles 75 and 76 range from 0° to 360°. The range of zenith angles relates to a structure of the spherical display. It is assumed that a user 71 is standing at the sphere center 52. In an embodiment, on the circle 75 (the horizontal plane of the zenith angle θ=90°), an azimuth spacing dϕ7 between any adjacent two of the light-emitting-diode pixels 78 is equivalent to) 360/(2πR Sin(90°/L), which is simplified as 360/(2πR/L). The symbol R represents the radial distance. The symbol L represents a width of a light-emitting surface of each of the light-emitting-diode pixels 78. A number of the light-emitting-diode pixels 78 of the circle 75 is 2πR Sin(90°)/L, which is simplified as 2πR/L. In an embodiment, on the circle 76 (the horizontal plane of the zenith angle θ6), an azimuth spacing dϕ8 between any adjacent two of the light-emitting-diode pixels 79 is equivalent to 360/(2πR Sin(θ6)/L). The symbol R represents the radial distance. The symbol L represents a width of a light-emitting surface of each of the light-emitting-diode pixels 79. A number of the light-emitting-diode pixels 79 of the circle 76 is 2πR Sin (θ6)/L.

Therefore, based on the spherical coordinate, the circle 75 is gradually reduced to the circle 76 as the zenith angle θ decreases to the pole (from 90° to 0°). The number of the light-emitting-diode pixels 79 is gradually reduced so as to obtain a dense stacking structure of the light-emitting-diode pixels 79. According to an embodiment, in the plurality of light-emitting-diode pixels, there is another azimuth spacing between adjacent two of the plurality of light-emitting-diode pixels at another zenith angle. In other words, at different zenith angles (for example, a zenith angle θ=90° and a zenith angle θ6), there are different azimuth spacing (for example, an azimuth spacing dϕ7 and an azimuth spacing dϕ8). Comparing the aforesaid dense stacking structure according to the spherical coordinate with a stacking according to the rectangular coordinate, the pixels stacked according to the rectangular coordinate may bring out larger voids between the pixels. In general, in order to solve the larger voids for the arrangement of the pixels stacked according to the rectangular coordinate, plane modules having a polygon shape, which is similar to a golf ball structure, are used. The plane modules are assembled as an enclosed space. Not only the effect of a sphere shape fails to be achieved, but displayed images may have an unnatural transition caused by the polygon shape. Therefore, the arrangement of pixels stacked according to the spherical coordinate improves the resolution of the images. In addition, the images appear smoother and more natural because the pixels stacked according to the spherical coordinate have no corners or irregular boundaries.

Figure 4:
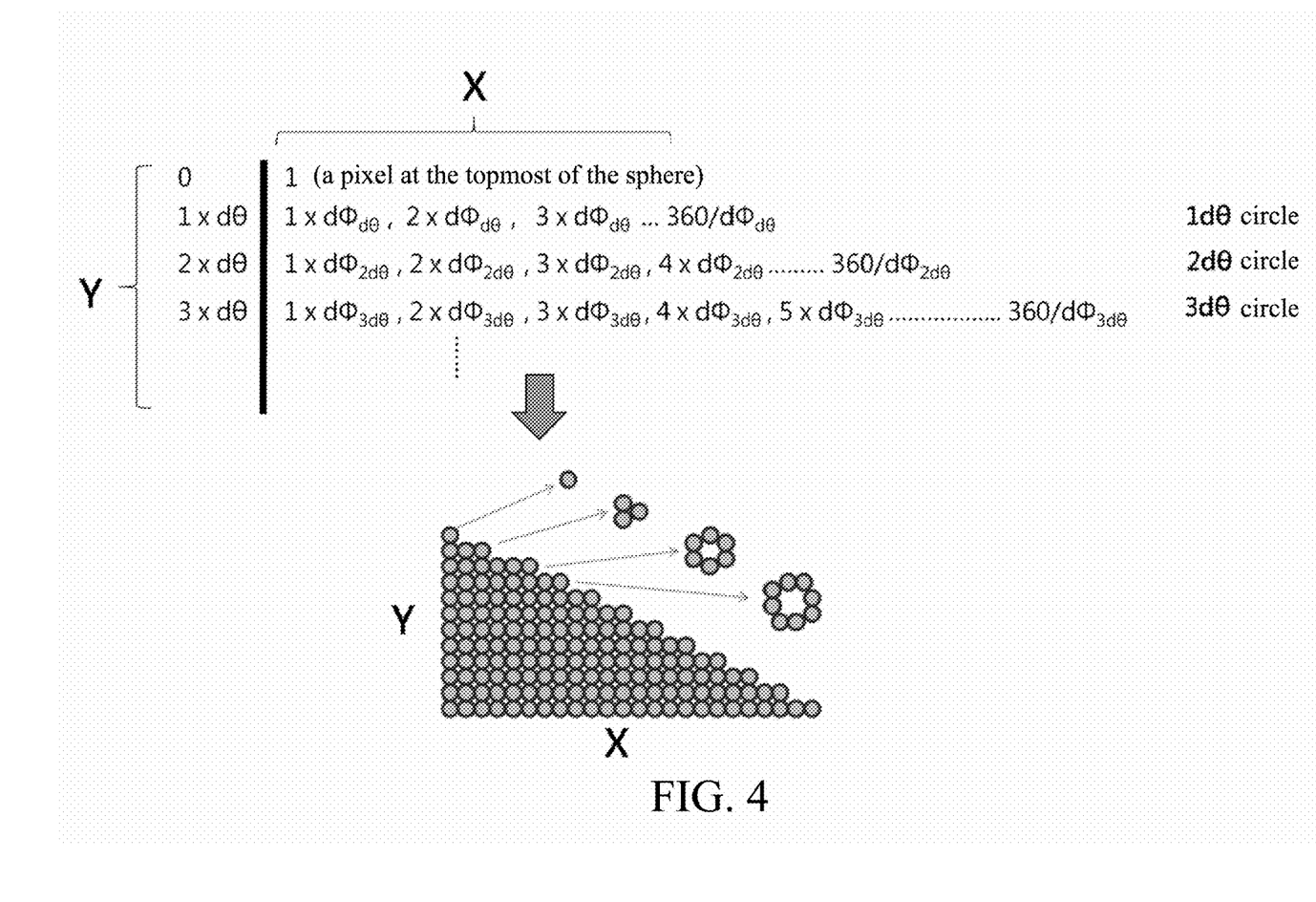
FIG. 4 is a diagram illustrating the panoramic vision system in accordance with an embodiment of the present disclosure.

FIG. 4 is a diagram illustrating the panoramic vision system 100 in accordance with an embodiment of the present disclosure. In general, images generated by a display are composed of pixels based on the rectangular coordinate. Regarding the image generation principle, the color and the brightness are defined by using software in advance. A hardware interface then transmits corresponding current or voltage signals to drive the pixels in the rectangular coordinate, to have each pixel appearing the correct color and brightness. As such, the images in the rectangular coordinate may correspond directly to the pixels in the rectangular coordinate. Thus, correct images are generated. In an embodiment of the disclosure, pixels are defined according to the spherical coordinate. A hardware interface needs to be redesigned to comply with the definition of the spherical coordinate. This problem may be solved by mathematical conversion of software. A pixel defined by the spherical coordinate may be converted into a matrix form in the rectangular coordinate through a mathematical transformation. There is a matrix transformation between the rectangular coordinate and the spherical coordinate. For example, a pixel at the pole of the sphere (θ=0°) may be converted into X=0 and Y=0 in the rectangular coordinate. The zenith spacing is defined as dθ, and pixels are stacked from the topmost (the zenith angle θ=0 is regarded as an arrangement). The pixels at each zenith angle may be regarded as a circle of pixels (as shown in FIG. 4, the pixels at each zenith angle may also be extended as a bar arrangement). The zenith angles are shown in the order of 1×dθ, 2×dθ, 3×dθ, n×dθ . . . , and 90°. At the zenith angle of θ=0°, there is a pixel at the top of the sphere. At the zenith angle of 1×dθ, the pixel arrangement starts with ϕ=0 and is defined as 1×dϕ$_{dθ}$, 2×dϕ$_{dθ}$, 3×dϕ$_{dθ}$ . . . , and 360/dϕ$_{dθ}$ in order. The coefficients 1, 2, 3 . . . , and n of the above series may be defined as the X coordinate of the matrix. The Y coordinate of the matrix may be defined as dθ/dθ=1. An adjacent zenith angle is 2×dθ, and the series of pixel arrangement is shown as 1×dϕ$_{2dθ}$, 2×dϕ$_{2dθ}$, 3×dϕ$_{2dθ}$, 4×dϕ$_{2dθ}$. . . , and 360/dϕ$_{2dθ}$ in order. Similarly, the X coordinate of the matrix may be defined as the coefficients of the above series. The Y coordinate of the matrix is defined as 2×dθ/dθ=2. An adjacent zenith angle is 3×dθ, and the series of pixel arrangement is shown as 1×dϕ$_{3dθ}$, 2×dϕ$_{3dθ}$, 3×dϕ$_{3dθ}$, 4×dϕ$_{3dθ}$, 5×dϕ$_{3dθ}$. . . , and 360/dϕ$_{3dθ}$. By using this mathematical relationship, spherical coordinates (r, ϕ, θ) corresponding to a pixel is derived into a matrix of the rectangular coordinates (r, X=ϕ/dϕ$_{ndθ}$, Y=θ/dθ). After the spherical coordinates are converted into the matrix form of the rectangular coordinates, the driving information of each pixel in the matrix may be defined. The existing hardware interface for the rectangular coordinates may still be used to drive the pixels according to the spherical coordinate. There is no need to modify the hardware interface. By using the mathematical relationship, the correct images are displayed on the spherical display 50 without modifying the hardware interface. The mathematical conversion of this software saves great expense of developing a special hardware interface for the spherical coordinates.

Figure 5:
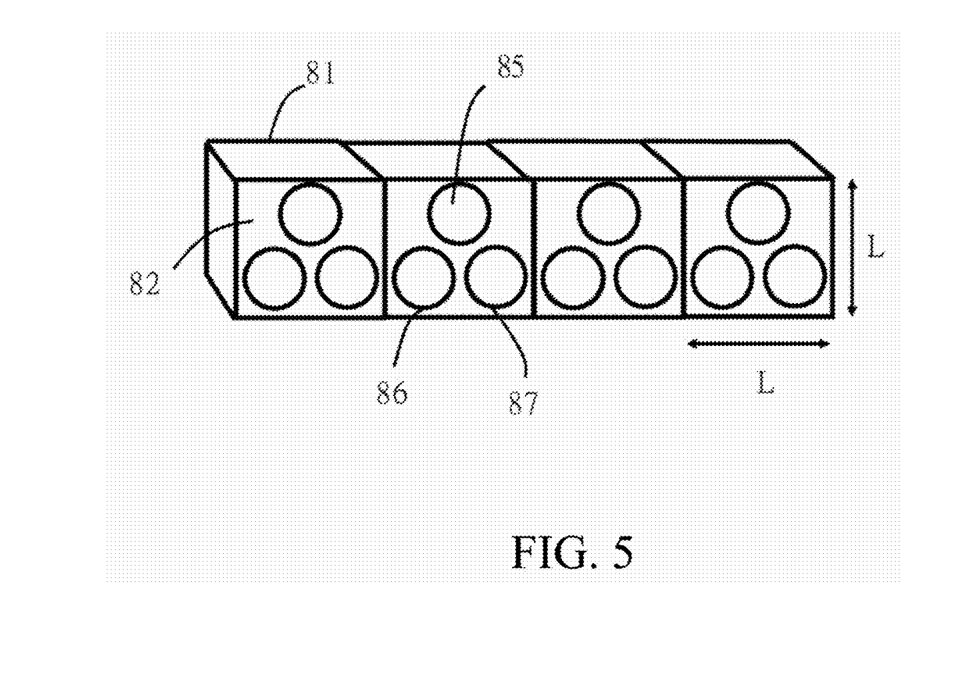
FIG. 5 is a diagram illustrating light-emitting-diode pixels in accordance with an embodiment of the present disclosure.

FIG. 5 is a diagram illustrating light-emitting-diode pixels 81 in accordance with an embodiment of the present disclosure. In the embodiment, the light-emitting-diode pixels 81 are self-emissive semiconductor electronic devices, such as inorganic light emitting diodes or organic light emitting diodes (OLEDs). In an embodiment, the spherical display 50 is composed of a plurality of light-emitting-diode pixels 81. A light-emitting surface 82 of each of the light-emitting-diode pixels 81 is square, and a side of the light-emitting surface 82 is labeled as L. Each of the light-emitting-diode pixels 81 comprises a red subpixel 85, a green subpixel 86, and a blue subpixel 87. In another embodiment, a light-emitting surface of each light-emitting-diode pixel of the plurality of light-emitting-diode pixels is circular. In an embodiment, the light-emitting-diode pixels 81 are implemented by micro light emitting diodes. The micro light emitting diodes have features such as fast reaction speed, brighter colors, high luminous intensity, and are suitable for large screen applications.

In an embodiment, the light-emitting-diode pixels 81 are assembled into flexible light bars in advance. Each of the flexible light bars is arranged in a ring in accordance with the aforesaid zenith spacing and the aforesaid azimuth spacing of the spherical coordinate, and further combined into a spherical display. In another embodiment, the light-emitting-diode pixels 81 are assembled into small area modules or slices, for example, a hexagonal arrangement. Then, each of the small area modules is arranged in a ring in accordance with the aforesaid zenith spacing and the aforesaid azimuth spacing of the spherical coordinate, and further combined into a spherical display.

In general, a pixel has 256 levels of brightness settings. The pixel is capable of displaying the level of darkness required by images. The light-emitting-diode pixels 81 have the characteristics of high luminance light sources since the pixels are self-emissive. The highest luminance is much higher than that of images generated by general pixels, such as projections or passive light sources. Therefore, the luminous intensity of the light-emitting-diode pixels 81 may be controlled individually. If some images are required to emit strong light, such as daylight, lamps, flashing, or reflected light, the luminous intensity of specific pixels may be adjusted. The brightness of a portion of the pixels is greater than the maximum luminous intensity of surrounding pixels, thereby resulting in significant brightness differences. While for a collimated projection system, the highest luminance of whole images of the projection system is determined by a light bulb of the projector. Therefore, the projected images of the projector have a consistent brightness.

Figure 6:
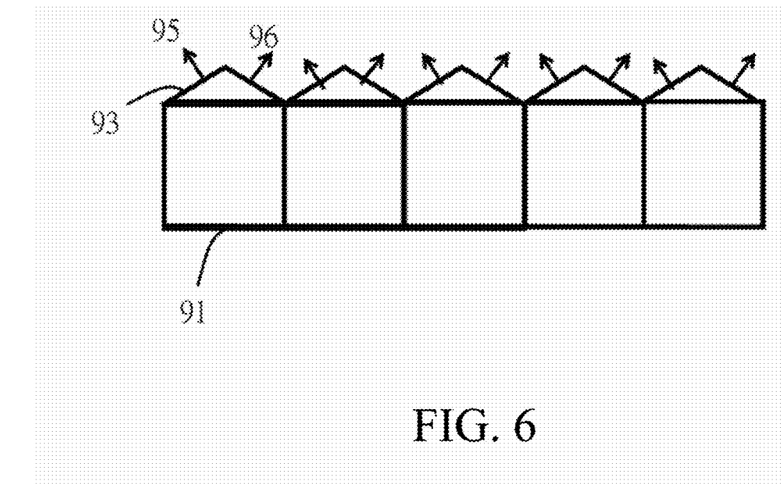
FIG. 6 is a diagram illustrating each of light-emitting-diode pixels in accordance with an embodiment of the present disclosure.

FIG. 6 is a diagram illustrating each of light-emitting-diode pixels 91 in accordance with an embodiment of the present disclosure. According to the embodiment, micro lenses 93 are located on light-emitting surfaces of the light-emitting-diode pixels 91, respectively. A normal vector of each of the light-emitting-diode pixels 91 is aligned with the sphere center 52. The micro lenses 93 separate emission paths from each other, shown as a light traveling direction 95 and a light traveling direction 96. This makes the vision of operators generate three dimensional images.

In an embodiment, an optical grating (not shown) may be located on light-emitting surfaces of the light-emitting-diode pixels 91. The optical grating may generate the effect of three dimensional images.

Figure 7:
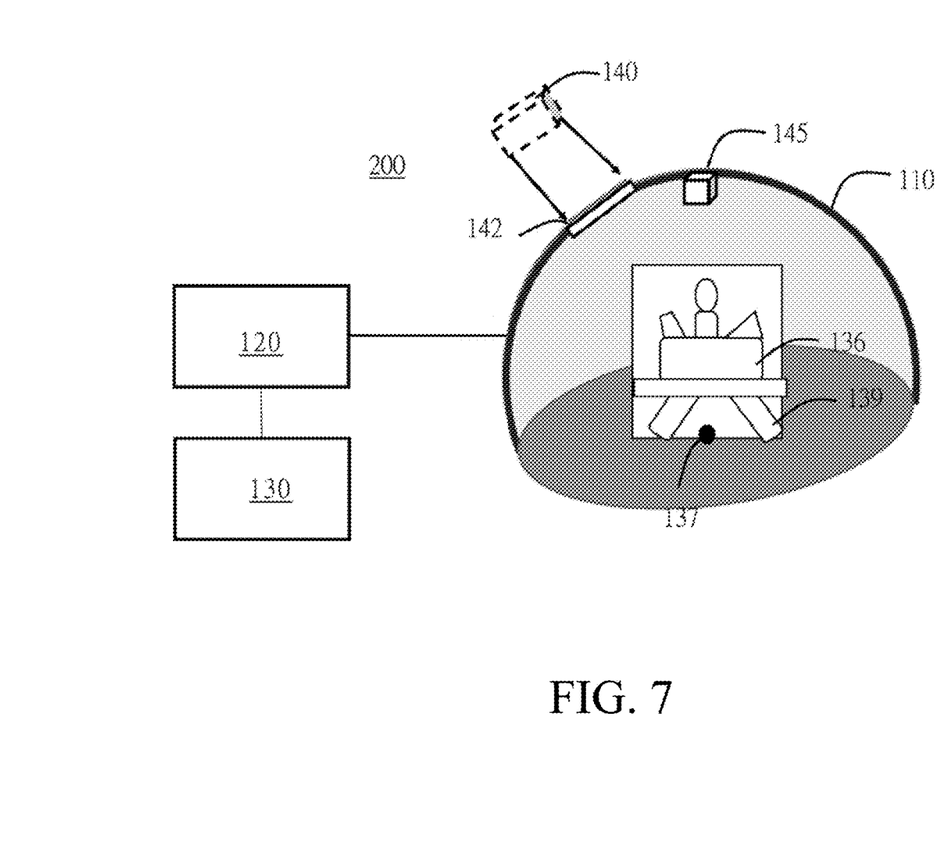
FIG. 7 is a diagram illustrating a panoramic vision system in accordance with an embodiment of the present disclosure.

FIG. 7 is a diagram illustrating a panoramic vision system 200 in accordance with an embodiment of the present disclosure. The panoramic vision system 200 comprises a spherical display 110, a processor 120, and a memory 130. The spherical display 110 is composed of a plurality of light-emitting-diode pixels, which are arranged according to the aforesaid spherical display 50. In an embodiment, the panoramic vision system 200 further comprises an aircraft cockpit 136. The aircraft cockpit 136 is located at a sphere center 137, and the aircraft cockpit 136 is coupled to the processor 120. The aircraft cockpit 136 and the spherical display 110 are configured to simulate a flight environment. By using the characteristics of self-emission of the light-emitting-diode pixels, the spherical display 110 simulates strong light such as daylight, light reflected from objects, backlighting, or flashing outside the aircraft cockpit 136. The light-emitting-diode pixels corresponding to the strong light generate a brighter luminous, resulting in bright difference between the strong light and other images. Therefore, the backlighting scenario in the daytime is simulated so as to enhance the real perception of simulated environment. In addition, the spherical display 110 having a panoramic view provides fighter pilots with viewing angles of all directions. In particular, the rear viewing angles may have the fighter pilots not only practicing the front attacks, but also practicing the defense of the rear.

In an embodiment, images corresponding to three-dimensional visual objects and being displayed on the spherical display 110 are calculated through hardware such as the processor 120 and the memory 130. In general, a three-dimensional simulation scene is calculated in accordance with a rectangular coordinate (X, Y, Z). The three-dimensional objects in the scene are also created according to a rectangular coordinate model. Since the pixels of the spherical display 110 take the spherical coordinate as a position reference, coordinates of the images projected onto the spherical display 110 need to be converted into a spherical coordinate. As such, the pixels shall be properly defined so as to emit light and display correct images. The relationship between three-dimensional visual objects and corresponding pixels may be calculated by the following method. Taking a user's eyeball as a sphere center 137, the sphere center 137 is also defined as an origin of the spherical coordinate (0, 0, 0). In general, regarding the image generation principle of the real world, the light reflected by surface points of a three-dimensional object is emitted to the eyeballs of the user. After all the light is received by the user's eyeball, the surface images of the three-dimensional object are formed in the brain.

In this panoramic vision system 200, it is assumed that a surface of a virtual object 140 is composed of a plurality of virtual points. A certain virtual point of the virtual object 140 is located at a position corresponding to such as a rectangular coordinate $(x_o, y_o, z_o)$, and there is a straight line extending from the certain virtual point to the sphere center 137. And assuming that the straight line does not cross other objects, and the straight line will intersect with the spherical display 110 having a radius R. The intersecting point at the spherical display 110 is also referred to as a displayed position of the certain virtual point. The certain virtual point will display at one pixel corresponding to intersecting point. The displayed pixel has a spherical coordinate: $(r=R, \theta=\mathrm{Sin}^{-1}((x_o^2+y_o^2)^{1/2}/(x_o^2+y_o^2+z_o^2)^{1/2}), \phi=\mathrm{Cos}^{-1}(x_o/(x_o^2+y_o^2)^{1/2})$. The symbol R is the radius of the spherical display 110. The symbol $\theta$ represents the zenith angle, and the symbol $\phi$ represents the azimuth angle. In one embodiment, the processor 120 is configured to transform a rectangular coordinate $(x_o, y_o, z_o)$ of the virtual point relative to the sphere center into the spherical coordinate $(r=R, \theta=\mathrm{Sin}^{-1}((x_o^2+y_o^2)^{1/2}/(x_o^2+y_o^2+z_o^2)^{1/2}), \phi=\mathrm{Cos}^{-1}(x_o/(x_o^2+y_o^2)^{1/2})$. The directions of the azimuth angles $\phi=0°$ and $\phi=180°$ are parallel to the X axis, and the directions of the zenith angles $\theta=0°$ and $\theta=180°$ are parallel to the Z axis. Collecting all intersecting points at the spherical display 110, an image 142 showing the virtual object 140 is defined and displayed on the spherical display 110. In addition, the light color and the light intensity for the image 142 are also calculated and defined by the processor 120. The aforesaid displayed pixels of the spherical display 110 emit light to the sphere center 137. The user may see three-dimensional images similar to the vision in the real world. In general, a simulator uses images generated by multiple projectors or uses multiple flat panel display modules to perform image mosaicking. Since the projectors or the display modules are provided with configurations of different angles/positions, there are multiple reference points for an entire visual system. Therefore, the visual system requires complex calculation of software to calibrate and adjust angles and the positions of the projectors. Or the complex calculation of software is used to adjust the angles and the positions of the flat panel display modules, the horizontal-lines between the display modules may be normalized and calibrated. Also, scene-horizontal-lines displayed by the display modules may be aligned together so as to form a consistent and continuous external scene.

In the present disclosure, the calculation scheme for generating images on the surface of the spherical display 110 need not perform the normalization and the calibration of the scene-horizontal-lines. The reason is that all pixels of the spherical display 110 and the image 142 are facing the same sphere center 137 and using the sphere center as a united standard. Therefore, the spherical display 110 and the image 142 have the same scene-horizontal-lines. In other words, in the present disclosure, the light-emitting units of imaging and the generation of displaying have a consistent structure. Therefore, the angles and the positions of the imaged display in the present disclosure need not be normalized or calibrated again. On the contrary, in general techniques, when the light-emitting units of imaging are compared with the display of projecting, their structures and angles are all inconsistent. Therefore, the spherical display 110 according to the embodiments of the present disclosure is easily constructed and designed.

In an embodiment, the aircraft cockpit 136 comprises a dynamic system 139. The dynamic system 139 is coupled to the spherical display 110. The dynamic system 139 is configured to generate vibration and rotational displacement. Cooperating with the panoramic vision system 200, the dynamic system 139 generates a corresponding gesture in accordance with the operator's instructions.

In an embodiment, the panoramic vision system 200 further comprises a treadmill or a skateboard (not shown). The treadmill is located at the sphere center 137, and the treadmill is coupled to the processor 120. The treadmill is allowed to walk in any direction. The treadmill and the spherical display 110 are configured to simulate a walking environment. The treadmill receives the walking speed and orientation of an operator. The processor 120 calculates a 360 degree panoramic view centered on the operator, and the panoramic view is displayed on the spherical display 110. The operator may directly observe the scenes at any direction by turning head without wearing a head-mounted display. In an embodiment, the skateboard may be an active type of equipment. The skateboard detects the walking speed of the operator and produces a corresponding speed of scrolling. The scrolling allows the operator to keep walking at a fixed position (relative to the center sphere 137).

In an embodiment, the panoramic vision system 200 may be applied to a control center of an unmanned aerial vehicle (UAV) or unmanned surface vehicle (USV) or unmanned space vehicle. The images captured by the unmanned aerial vehicle are transmitted back to the panoramic vision system 200. The panoramic vision system 200 generates a 360 degree panoramic view. The panoramic vision system 200 not only increases three-dimensional sense of space for the operator, but also increases the perception ability of the surrounding environment. The panoramic vision system 200 avoids limited viewing angles and unnatural visual operating environment. The panoramic vision system 200 provides the operators with a complete environmental image, thereby enhancing the efficiency of the relevant operations. In an embodiment, the panoramic vision system 200 further comprises an unmanned vehicle (not shown). The unmanned vehicle is coupled to the processor 120, wherein the unmanned vehicle is configured to capture external environmental images and feedback the environmental images to the processor 120. Further, the environmental images are displayed on the spherical display 110.

In an embodiment, after the processor 120 receives the images captured from outside, the processor 120 converts the images into three-dimensional virtual objects 140. Further, the processor 120 calculates the images 142 displayed on the spherical display 110 corresponding to the virtual objects 140. Accordingly, the three-dimensional virtual objects 140 are converted to the images 142 having the characteristics of the spherical coordinate. Therefore, the entire spherical display 110 shows a 360 degree panoramic view.

In an embodiment, the panoramic vision system 200 further comprises a sensor 145. The sensor 145 captures the actions of the operator, and transmits the signals of the actions to the processor 120. Further, the processor 120 calculates a 360 degree panoramic view corresponding to the actions of the operator. The operator may directly observe the scenes at any direction simply by turning head without wearing a head-mounted display. The visual scenes are similar to the realistic environment.

In an embodiment, the panoramic vision system 200 further comprises a driving cockpit of transportation (not shown). The driving cockpit of transportation is located at the sphere center 137, wherein the driving cockpit of transportation is coupled to the processor 120. The driving cockpit of transportation and the spherical display 110 are configured to simulate a driving environment.

In an embodiment, the panoramic vision system 200 further comprises an optical film (not shown). The optical film is located on the plurality of light-emitting-diode pixels of the spherical display 110. The optical film is configured to filter a blue light.

The panoramic vision system of the present disclosure is based on the spherical coordinate. The panoramic vision system achieves a dense stacking of light-emitting-diode pixels so as to enhance the resolution of the images. The panoramic vision system avoids the uneven distribution of the pixel density. Compared to the projection systems, the panoramic vision system does not employ multiple projectors, optical mirrors, or optical refractors, resulting in a smaller size. Since the characteristics of the self-emissive, the panoramic vision system simulates different light intensities. The panoramic vision system provides viewing angles of 360 degrees so that the operator feels reality as the operator were there.

It will be apparent to those skilled in the art that various modifications and variations can be made to the disclosed embodiments. It is intended that the specification and examples be considered as exemplary embodiments only, with a scope of the disclosure being indicated by the following claims and their equivalents.

What is claimed is:

1. A panoramic vision system, comprising:
   a processor configured to convert received images into images in a spherical coordinate;
   a memory coupled to the processor and configured to store the images in the spherical coordinate; and
   a spherical display coupled to the processor, wherein the spherical display has a sphere center, the spherical display comprises a plurality of light-emitting-diode pixels being arranged according to the spherical coordinate, there is a same radial distance between each light-emitting-diode pixel of the plurality of light-emitting-diode pixels and the sphere center, in the plurality of light-emitting-diode pixels, there is a same azimuth spacing between adjacent two of the plurality of light-emitting-diode pixels at a zenith angle, and there is a same zenith spacing between adjacent two of the plurality of light-emitting-diode pixels at an azimuth angle.

2. The panoramic vision system according to claim 1, wherein in the plurality of light-emitting-diode pixels, there is the same zenith spacing between adjacent two of the plurality of light-emitting-diode pixels at another azimuth angle.

3. The panoramic vision system according to claim 1, wherein in the plurality of light-emitting-diode pixels, there is another azimuth spacing between adjacent two of the plurality of light-emitting-diode pixels at another zenith angle.

4. The panoramic vision system according to claim 1, wherein the zenith angle has a range from 0 degree to 180 degrees.

5. The panoramic vision system according to claim 1, wherein the azimuth angle has a range from 0 degree to 360 degrees.

6. The panoramic vision system according to claim 1, wherein a light-emitting surface of each light-emitting-diode pixel of the plurality of light-emitting-diode pixels is square.

7. The panoramic vision system according to claim 1, wherein a light-emitting surface of each light-emitting-diode pixel of the plurality of light-emitting-diode pixels is circular.

8. The panoramic vision system according to claim 1, wherein each light-emitting-diode pixel of the plurality of light-emitting-diode pixels comprises a red subpixel, a green subpixel, and a blue subpixel.

9. The panoramic vision system according to claim 1, wherein the zenith spacing is equal to $360/(2\pi R/L)$, where R represents the radial distance, and L represents a width of a light-emitting surface of each light-emitting-diode pixel of the plurality of light-emitting-diode pixels.

10. The panoramic vision system according to claim 1, wherein the azimuth spacing is equal to 360/(2πR Sin(θ)/L), where R represents the radial distance, L represents a width of a light-emitting surface of each light-emitting-diode pixel of the plurality of light-emitting-diode pixels, and θ represents the zenith angle.

11. The panoramic vision system according to claim 1, wherein at the zenith angle, a number of the plurality of light-emitting-diode pixels is 2πR Sin(θ)/L, where R represents the radial distance, L represents a width of a light-emitting surface of each light-emitting-diode pixel of the plurality of light-emitting-diode pixels, and θ represents the zenith angle.

12. The panoramic vision system according to claim 1, wherein at the azimuth angle, a number of the plurality of light-emitting-diode pixels is πR/2L, where R represents the radial distance, and L represents a width of a light-emitting surface of each light-emitting-diode pixel of the plurality of light-emitting-diode pixels.

13. The panoramic vision system according to claim 1, further comprising:
an aircraft cockpit located at the sphere center and coupled to the processor, wherein the aircraft cockpit and the spherical display are configured to simulate a flight environment.

14. The panoramic vision system according to claim 13, wherein the aircraft cockpit comprises a dynamic system coupled to the spherical display and configured to generate vibration and rotational displacement.

15. The panoramic vision system according to claim 1, further comprising:
a driving cockpit of transportation located at the sphere center and coupled to the processor, wherein the driving cockpit of transportation and the spherical display are configured to simulate a driving environment.

16. The panoramic vision system according to claim 1, further comprising:
a micro lens located on each light-emitting-diode pixel of the plurality of light-emitting-diode pixels.

17. The panoramic vision system according to claim 1, further comprising:
an optical grating located on each light-emitting-diode pixel of the plurality of light-emitting-diode pixels.

18. The panoramic vision system according to claim 1, wherein the processor is configured to implement a two-dimensional-plus-depth-of-field image algorithm, allowing the images in the spherical coordinate to be compatible with the spherical display.

19. The panoramic vision system according to claim 1, further comprising:
a treadmill located at the sphere center and coupled to the processor, wherein the treadmill is configured to allow for walking in any direction, and the treadmill and the spherical display are configured to simulate a walking environment.

20. The panoramic vision system according to claim 1, further comprising:
an unmanned vehicle coupled to the processor and configured to capture environmental images and feedback the environmental images to the processor, wherein the spherical display is configured to display the environmental images.

21. The panoramic vision system according to claim 1, wherein one of the plurality of light-emitting-diode pixels has a spherical coordinate $(r, \phi, \theta)$ having a relationship to a rectangular coordinate matrix $(r, X=\phi/d\phi_{nd\theta}, Y=\theta/d\theta)$, where r represents the radial distance, $d\theta$ represents the zenith spacing, $\theta$ represents the zenith angle, $d\phi$ represents the azimuth spacing, $\phi$ represents the azimuth angle, and n is a positive integer.

22. The panoramic vision system according to claim 1, wherein the processor is configured to transform a rectangular coordinate $(x_o, y_o, z_o)$ of a virtual point relative to the sphere center into a spherical coordinate $(r=R, \theta=\text{Sin}^{-1}((x_o^2+y_o^2)^{1/2}/(x_o^2+y_o^2+z_o^2)^{1/2}), \phi=\text{Cos}^{-1}(x_o/(x_o^2+y_o^2)^{1/2}))$ of one of the plurality of light-emitting-diode pixels, where R represents the radial distance, $\theta$ represents the zenith angle, and $\phi$ represents the azimuth angle.

23. The panoramic vision system according to claim 1, further comprising:
an optical film located on the plurality of light-emitting-diode pixels of the spherical display and configured to filter a blue light.

24. The panoramic vision system according to claim 1, wherein the plurality of light-emitting-diode pixels are assembled into a plurality of flexible light bars.

* * * * *